(12) United States Patent
Redfield et al.

(10) Patent No.: US 11,642,757 B2
(45) Date of Patent: May 9, 2023

(54) USING SACRIFICIAL MATERIAL IN ADDITIVE MANUFACTURING OF POLISHING PADS

(71) Applicant: Applied Materials, Inc., Santa Clara, CA (US)

(72) Inventors: Daniel Redfield, Morgan Hill, CA (US); Jason Garcheung Fung, Santa Clara, CA (US); Mayu Felicia Yamamura, San Carlos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 168 days.

(21) Appl. No.: 17/137,304

(22) Filed: Dec. 29, 2020

(65) Prior Publication Data

US 2021/0114172 A1 Apr. 22, 2021

Related U.S. Application Data

(63) Continuation of application No. 15/873,851, filed on Jan. 17, 2018, now Pat. No. 10,882,160.
(Continued)

(51) Int. Cl.
*B24D 11/00* (2006.01)
*B29C 64/112* (2017.01)
(Continued)

(52) U.S. Cl.
CPC .......... *B24D 11/006* (2013.01); *B29C 64/112* (2017.08); *B29C 64/282* (2017.08);
(Continued)

(58) Field of Classification Search
None
See application file for complete search history.

(56) References Cited

U.S. PATENT DOCUMENTS 5,257,478 A 11/1993 Hyde et al.
5,387,380 A 2/1995 Cima et al.
(Continued)

FOREIGN PATENT DOCUMENTS

DE 19834559 2/2000
EP 1512519 3/2005
(Continued)

OTHER PUBLICATIONS

'Wikipedia' [online]. "3D printing," 2013, [retrieved on Feb. 25, 2013]. Retrieved from the Internet: URL:http://en.wikipedia.org/wiki/3D_printing 17 pages.
(Continued)

*Primary Examiner* — Robert J Grun
(74) *Attorney, Agent, or Firm* — Fish & Richardson P.C.

(57) ABSTRACT

A method of fabricating a polishing pad using an additive manufacturing system includes depositing a first set successive layers by droplet ejection to form a. Depositing the successive layers includes dispensing a polishing pad precursor to first regions corresponding to partitions of the polishing pad and dispensing a sacrificial material to second regions corresponding to grooves of the polishing pad. Removing the sacrificial material provides the polishing pad with a polishing surface that has the partitions separated by the grooves.

9 Claims, 13 Drawing Sheets

Related U.S. Application Data

(60) Provisional application No. 62/511,276, filed on May 25, 2017.

(51) Int. Cl.
    *B29C 64/393*     (2017.01)
    *B33Y 30/00*     (2015.01)
    *B33Y 80/00*     (2015.01)
    *B33Y 50/02*     (2015.01)
    *B33Y 10/00*     (2015.01)
    *B29C 64/282*     (2017.01)
    *B29C 64/40*     (2017.01)
    *C09G 1/16*     (2006.01)
    *B24B 37/20*     (2012.01)
    *B29L 31/00*     (2006.01)

(52) U.S. Cl.
CPC ............ *B29C 64/393* (2017.08); *B29C 64/40* (2017.08); *B33Y 10/00* (2014.12); *B33Y 30/00* (2014.12); *B33Y 50/02* (2014.12); *B33Y 80/00* (2014.12); *C09G 1/16* (2013.01); *B24B 37/20* (2013.01); *B29L 2031/736* (2013.01)

(56) References Cited

U.S. PATENT DOCUMENTS

| | | |
|---|---|---|
| 5,738,574 A | 4/1998 | Tolles et al. |
| 5,900,164 A | 5/1999 | Budinger et al. |
| 5,906,863 A | 5/1999 | Lombardi et al. |
| 5,921,855 A | 7/1999 | Osterheld et al. |
| 5,932,290 A | 8/1999 | Lombardi et al. |
| 5,940,674 A | 8/1999 | Sachs et al. |
| 6,423,255 B1 | 7/2002 | Hoechsmann et al. |
| 6,875,097 B2 | 4/2005 | Grundwald |
| 6,899,611 B2 | 5/2005 | Reinhardt et al. |
| 7,497,977 B2 | 3/2009 | Nielsen et al. |
| 7,524,345 B2 | 4/2009 | Nevoret et al. |
| 7,531,117 B2 | 5/2009 | Ederer et al. |
| 9,031,680 B2 | 5/2015 | Napadensky |
| 9,067,299 B2 | 6/2015 | Bajaj |
| 9,073,260 B2 | 7/2015 | El-Siblani et al. |
| 9,073,261 B2 | 7/2015 | El-Siblani et al. |
| 9,073,262 B2 | 7/2015 | El-Siblani et al. |
| 9,079,355 B2 | 7/2015 | El-Siblani et al. |
| 9,421,666 B2 | 8/2016 | Krishnan |
| 9,457,520 B2 | 10/2016 | Bajaj |
| 9,542,525 B2 | 1/2017 | Arisoy et al. |
| 9,662,840 B1 | 5/2017 | Buller et al. |
| 9,744,724 B2 | 8/2017 | Bajaj et al. |
| 10,137,644 B2 | 11/2018 | De Pena et al. |
| 10,882,160 B2 * | 1/2021 | Redfield .................. B29C 64/40 |
| 2001/0003004 A1 | 6/2001 | Leyden et al. |
| 2001/0020448 A1 | 9/2001 | Vaartstra et al. |
| 2002/0111707 A1 | 8/2002 | Li |
| 2004/0154533 A1 | 8/2004 | Agarwal et al. |
| 2005/0012247 A1 | 1/2005 | Kramer |
| 2005/0049739 A1 | 3/2005 | Kramer |
| 2005/0074596 A1 | 4/2005 | Nielsen et al. |
| 2005/0110853 A1 | 5/2005 | Gardner et al. |
| 2005/0248065 A1 | 11/2005 | Owada |
| 2005/0278056 A1 | 12/2005 | Farnworth |
| 2006/0019587 A1 | 1/2006 | Deopura et al. |
| 2006/0099287 A1 | 5/2006 | Kim |
| 2006/0111807 A1 | 5/2006 | Gothait |
| 2006/0160478 A1 | 7/2006 | Donohue et al. |
| 2006/0192315 A1 | 8/2006 | Farr et al. |
| 2007/0128991 A1 | 6/2007 | Yoon et al. |
| 2007/0212979 A1 | 9/2007 | Preston |
| 2007/0235904 A1 | 10/2007 | Saikin |
| 2007/0249070 A1 | 10/2007 | Brodsky et al. |
| 2008/0157436 A1 | 7/2008 | Patel et al. |
| 2008/0211141 A1 | 9/2008 | Deopura et al. |
| 2009/0321979 A1 | 12/2009 | Hiraide |
| 2010/0191360 A1 | 7/2010 | Napadensky |
| 2010/0323050 A1 | 12/2010 | Kumagai et al. |
| 2011/0059247 A1 | 3/2011 | Kuzusako et al. |
| 2012/0282849 A1 | 11/2012 | Kerprich et al. |
| 2013/0017764 A1 | 1/2013 | Allison et al. |
| 2013/0027458 A1 | 1/2013 | Sirringhaus et al. |
| 2013/0027845 A1 | 1/2013 | Fujii et al. |
| 2013/0283700 A1 | 10/2013 | Bajaj et al. |
| 2014/0107823 A1 | 4/2014 | Huang |
| 2014/0206268 A1 | 7/2014 | Lefevre et al. |
| 2014/0324206 A1 | 10/2014 | Napadensky |
| 2015/0044951 A1 | 2/2015 | Bajaj et al. |
| 2015/0111476 A1 | 4/2015 | Tsai et al. |
| 2015/0126099 A1 | 5/2015 | Krishnan et al. |
| 2015/0174826 A1 | 6/2015 | Murugesh et al. |
| 2016/0023403 A1 | 1/2016 | Ramos et al. |
| 2016/0082666 A1 | 3/2016 | De Pena et al. |
| 2016/0107287 A1 | 4/2016 | Bajaj et al. |
| 2016/0107290 A1 | 4/2016 | Bajaj et al. |
| 2016/0107382 A1 | 4/2016 | Wada |
| 2016/0144563 A1 | 5/2016 | Elliot |
| 2017/0165922 A1 | 6/2017 | Hakkaku |
| 2017/0259396 A1 | 9/2017 | Yamamura et al. |
| 2017/0355140 A1 | 12/2017 | Bajaj et al. |
| 2018/0086006 A1 | 3/2018 | Proctor et al. |
| 2018/0339397 A1 | 11/2018 | Redfield |
| 2018/0339401 A1 | 11/2018 | Redfield et al. |
| 2018/0339402 A1 | 11/2018 | Redfield et al. |
| 2018/0339447 A1 | 11/2018 | Redfield |
| 2019/0084220 A1 | 3/2019 | Ochi et al. |
| 2022/0001507 A1 | 1/2022 | Yamamura et al. |

FOREIGN PATENT DOCUMENTS

| | | |
|---|---|---|
| EP | 1661690 | 5/2006 |
| EP | 2277686 | 1/2011 |
| EP | 2431157 | 3/2012 |
| EP | 2952332 | 12/2015 |
| JP | H9-50974 | 2/1997 |
| JP | 2002-28849 | 1/2002 |
| JP | 2003-103674 | 4/2003 |
| JP | 2006-95680 | 4/2006 |
| JP | 2008-507417 | 3/2008 |
| JP | 2008-531306 | 8/2008 |
| JP | 2011-67946 | 4/2011 |
| JP | 5463653 | 4/2014 |
| JP | 2015-517922 | 6/2015 |
| KR | 10-2005-0052876 | 6/2005 |
| KR | 10-2008-0038607 | 5/2008 |
| KR | 10-2013-0014782 | 2/2013 |
| TW | 201234466 | 8/2012 |
| WO | WO 01/64396 | 9/2001 |
| WO | WO 02/24415 | 3/2002 |
| WO | WO 2013/128452 | 9/2013 |
| WO | WO 2015/065793 | 5/2015 |
| WO | WO 2015/105047 | 7/2015 |
| WO | WO 2016/060712 | 4/2016 |
| WO | WO 2016/061544 | 4/2016 |

OTHER PUBLICATIONS

Cook, "CMP Consumables II: Pad," Semiconductors and Semimetals, 2000, 155-181.
Desai et al. "Effect of Polishing Pad Material Properties on Chemical Mechanical Polishing (CMP) Processes," Center for Polymer Research, University of Texas, Austin, TX 78712, 1994, 8 pages.
PCT International Search Report and Written Opinion in International Application No. PCT/US2018/034699, dated Sep. 19, 2018, 22 pages.
Jun et al., "Slicing Bitmap Generation and Patterning technique a SFF System Using UV-resin," International Conference on Control, Automation and Systems (2007).
Krober et al., "Reactive inkjet printing of polyurethanes," Journal of Materials Chemistry 19:5234-5238 (2009).
Rodel, Rodel IC1000 CMP Pad, 1999, 2 pages.
Van den Berg et al., "Inkjet printing of polyurethane colloidal suspensions," Soft Matter 3:238-243 (2007).

(56) References Cited

OTHER PUBLICATIONS

Yang et al., "High Viscosity Jetting System for 3D Reactive Inkjet Printing," Twenty Forth Annual International Solid Freeform Fabrication Symposium (2013), pp. 505-513.

* cited by examiner

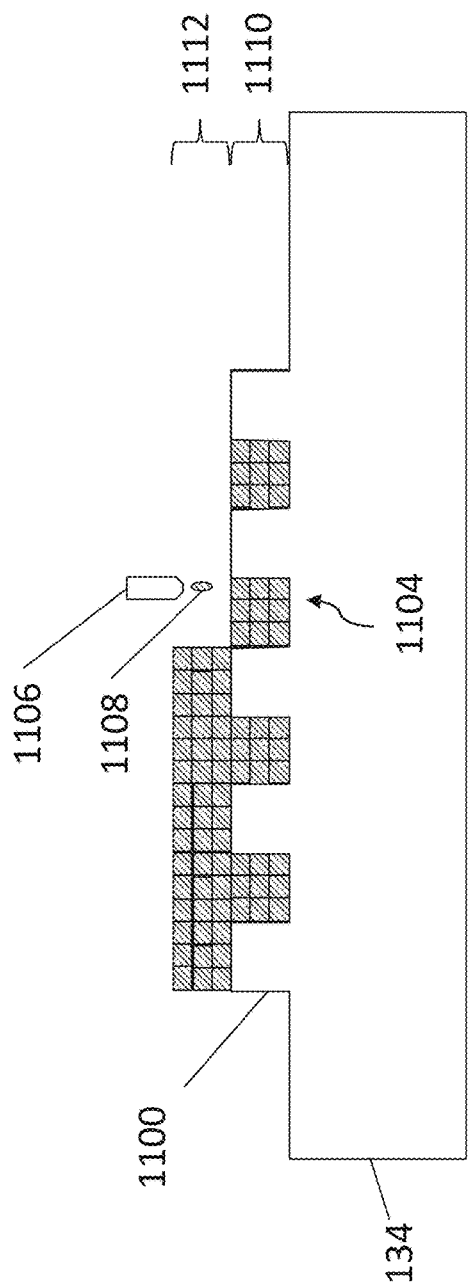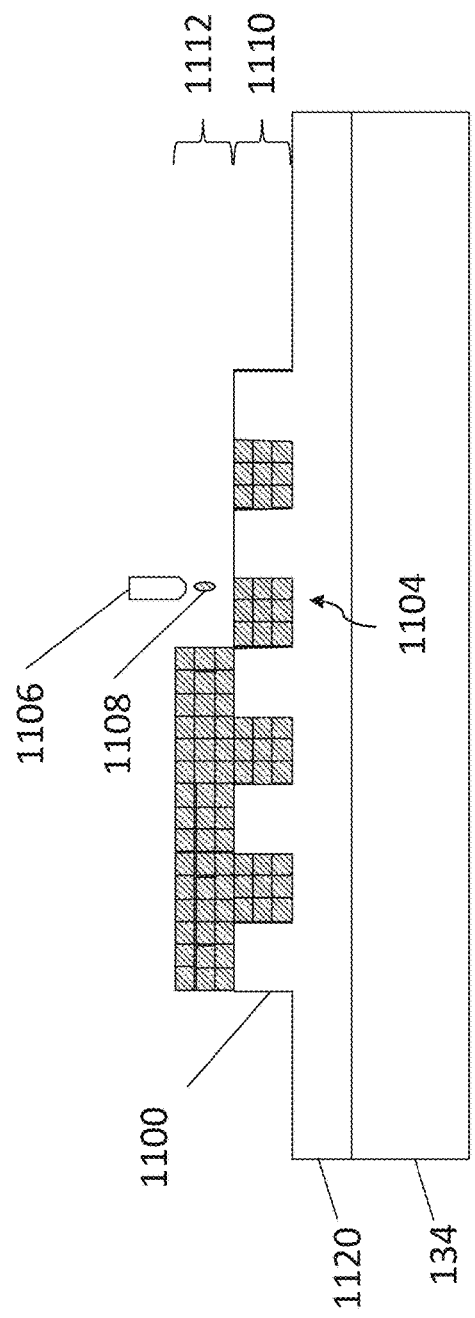

USING SACRIFICIAL MATERIAL IN ADDITIVE MANUFACTURING OF POLISHING PADS

CROSS-REFERENCE TO RELATED APPLICATIONS

This application is a continuation of U.S. patent application Ser. No. 15/873,851, filed Jan. 17, 2018, which claims priority to U.S. Application Ser. No. 62/511,276, filed on May 25, 2017, the entire disclosures of which are incorporated by reference.

TECHNICAL FIELD

This specification relates to additive manufacturing, particularly additive manufacturing of chemical mechanical polishing pads.

BACKGROUND

An integrated circuit is typically formed on a substrate by the sequential deposition of conductive, semiconductive, or insulative layers on a silicon wafer. A variety of fabrication processes require planarization of a layer on the substrate. For certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing pad.

One objective of a chemical mechanical polishing process is polishing uniformity. If different areas on the substrate are polished at different rates, then it is possible for some areas of the substrate to have too much material removed ("over-polishing") or too little material removed ("underpolishing"). In addition to planarization, polishing pads can be used for finishing operations such as buffing.

Polishing pads are typically made by molding, casting or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

SUMMARY

The present disclosure describes manufacturing polishing pads with an additive manufacturing system.

In one aspect, a method of fabricating a polishing pad using an additive manufacturing system includes receiving data indicative of a desired shape of the polishing pad to be fabricated by droplet ejection by the additive manufacturing system. The data includes a desired shape defining a desired profile including a polishing surface having one or more partitions separated by one or more grooves on the polishing pad. Data indicative of distortions from the desired profile caused by dispensing of layers by droplet ejection by the additive manufacturing system is generated. Data indicative of an initial layer to dispense by droplet ejection is generated to at least partially compensate for the distortions from the desired profile. The initial layer is dispensed on a support by droplet ejection. Overlying layers are dispensed on the initial layer by droplet ejection by the additive manufacturing system to form the polishing pad.

Implementations may include one or more of the following features.

The polishing pad may include the initial layer. The polishing pad may include the support. The polishing pad may be removed from the support. The distortions may include regions expected to be thin relative to the desired profile. The initial layer may include voxels corresponding to the regions. The regions may correspond to edges of the one or more partitions.

In another aspect, a method of fabricating a polishing pad using an additive manufacturing system includes depositing successive layers by droplet ejection to form the polishing pad. The polishing pad includes a polishing surface having one or more partitions separated by one or more grooves. Depositing a layer of the successive layers includes dispensing first regions corresponding to edges of the one or more partitions by a first droplet ejection process. After curing the first regions, a second region corresponding to interior of the one or more partitions is dispensed between the edges by a different second droplet ejection process.

Implementations may include one or more of the following features.

The first droplet ejection process may include a first polymer and the second droplet ejection process may include a second polymer of different composition. The first droplet ejection process may include a first curing radiation and the second droplet ejection process may include a second curing radiation that cures the layer slower than the first curing radiation. The first curing radiation and the second curing radiation may be at different wavelengths. The first curing radiation may have a higher intensity than the second curing radiation. Droplets need not be ejected into regions corresponding to the grooves.

In another aspect, a method of fabricating a polishing pad using an additive manufacturing system includes depositing a first set of successive layers onto a support by droplet ejection. Depositing the first set of successive layers includes dispensing a polishing pad precursor to first regions corresponding to partitions of the polishing pad and dispensing a sacrificial material to second regions corresponding to grooves of the polishing pad. A second set of successive layers is deposited by droplet ejection over the first set of successive layers. The second set of successive layers corresponds to a lower portion of the polishing pad. The first set of successive layer and the second set of successive layers provide a body. The body is removed from the support. Removing the sacrificial material from the body provides the polishing pad with a polishing surface that has the partitions separated by the grooves.

Implementations may include one or more of the following features.

Depositing the second set of successive layers may include dispensing the polishing pad precursor. The second set of successive layers may correspond to a lower portion of the polishing layer. A third set of successive layers may be deposited by droplet ejection over the second set of successive layers. The third set of successive layers may have a different composition than the second set of successive layers. The second set of successive layers may correspond to a sub-pad of the polishing layer. The second set of successive layers may span both the first regions and the second regions.

The polishing pad precursor may be cured. The sacrificial material may be cured. The polishing pad precursor may be a first polymer precursor and the sacrificial material may be a second polymer precursor of different composition. Depositing the third plurality of successive layers may include droplet ejection of the polishing pad precursor and curing the third plurality of successive layers with a different wavelength or intensity of light than the second plurality of successive layers. Depositing the third plurality of successive layers may include droplet ejection of a polymer precursor of different composition than the polishing pad precursor. Removing the sacrificial material may include etching or lifting the polishing pad off the sacrificial material.

In another aspect an additive manufacturing system includes a support, a first dispenser configured to dispense a polishing pad precursor by droplet ejection, a second dispenser configured to dispense a sacrificial material, at least one energy source, and a controller. The controller is configured to receive data indicative of a desired shape of a polishing pad to be fabricated by droplet ejection by an additive manufacturing system. The polishing pad has a polishing surface having one or more partitions separated by one or more grooves. The controller is configured to cause the first dispenser to deliver the polishing pad precursor to first regions corresponding to partitions of the polishing pad, and cause the second dispenser to deliver the sacrificial material to second regions corresponding to grooves of the polishing pad.

Implementations may include one or more of the following features.

The controller may be configured to cause the first dispenser to deposit a second plurality of successive layers by droplet ejection over the first plurality of successive layers. The second plurality of successive layers may correspond to a lower portion of the polishing pad. A third dispenser may be configured to dispense a second polishing pad precursor by droplet ejection. The controller may be configured to cause the third dispenser to deposit a second plurality of successive layers by droplet ejection over the first plurality of successive layers. The second plurality of successive layers may correspond to a lower portion of the polishing pad.

The controller may be configured is configured to cause the first dispenser to deposit a second plurality of successive layers by droplet ejection over the first plurality of successive layers, and to cause the third dispenser to deposit a third plurality of successive layers by droplet ejection over the second plurality of successive layers, the first and second pluralities of successive layers corresponding to a lower portion of the polishing pad.

The second dispenser may be configured to dispense the sacrificial material by droplet ejection.

In another aspect, a method of fabricating an object using an additive manufacturing system includes depositing onto a support a first plurality of successive layers by droplet ejection, depositing a second plurality of successive layers by droplet ejection over the first plurality of successive layers with the second plurality of successive layers corresponding to a lower portion of the object, the first plurality of successive layer and the second plurality of successive layers providing a body; removing the body from the support, and removing the sacrificial material from the body to provide the object comprising the surface having the projections separated by the recesses. Depositing the first plurality of successive layers includes dispensing a polymer precursor to first regions corresponding to protrusions on a surface of the object, dispensing a sacrificial material to second regions corresponding to recesses on the surface of the object, and curing the polymer precursor.

Advantages of the foregoing may include, but are not limited to, the following. The geometry of a polishing pad can be more precisely controlled, thereby improving polishing efficacy of the polishing pad. Furthermore, a correction profile can compensate for potential distortions by adjusting data that the additive manufacturing apparatus uses to form an article, e.g., a polishing pad, rather than removing material after the article has been initially formed. The amount of post-processing of the article after it is formed by the additive manufacturing apparatus can be decreased. As a result, an amount of feed material waste can be reduced, and yield and throughput can be increased. The need for a secondary machining step may be eliminated. The change in slurry capture volume of the polishing pad as the surface is removed and the groove depth decreases may be reduced, thus improving wafer-to-wafer uniformity. The capture material may also be removed through a selective etching process to leave only the desired material, which can be beneficial where an optically transparent material used as in the formation of a CMP window and in fixed abrasive, roll format pad designs.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 11A is a schematic side view of another implementation of an additive manufacturing apparatus.
FIG. 11B is a schematic side view of another implementation of an additive manufacturing apparatus.

Like reference numbers and designations in the various drawings indicate like elements.

DETAILED DESCRIPTION

An additive manufacturing apparatus can be used to form a polishing pad. The additive manufacturing apparatus can be provided with an initial pattern to dispense feed material. The initial pattern corresponds to a desired shape of the polishing pad to be formed. Unfortunately, when the polishing pad is formed by the additive manufacturing apparatus using the initial pattern, an actual shape of the polishing pad may include distortions relative to the desired shape of the polishing pad. However, several techniques can be used to compensate for such distortions.

The initial pattern provided to the additive manufacturing apparatus can be modified by a correction profile to generate a modified pattern to at least partially compensate for these distortions. The resulting shape formed using the modified pattern can thus more closely match the desired shape of the polishing pad. The modified pattern can include an initial layer onto which additional layers are deposited.

Portions of the polishing pad corresponding to the edges of the partitions can be a deposited by a different technique than a center of the partitions, e.g., to provide improved verticality of side walls.

A sacrificial material can be deposited, and layers of the pad can be deposited between and over the sacrificial. This sacrificial material can then be removed to provide the grooves, surface texture to reduce break-in times, and to manufacture a polishing pad in a roll-to-roll format.

Figure 1:
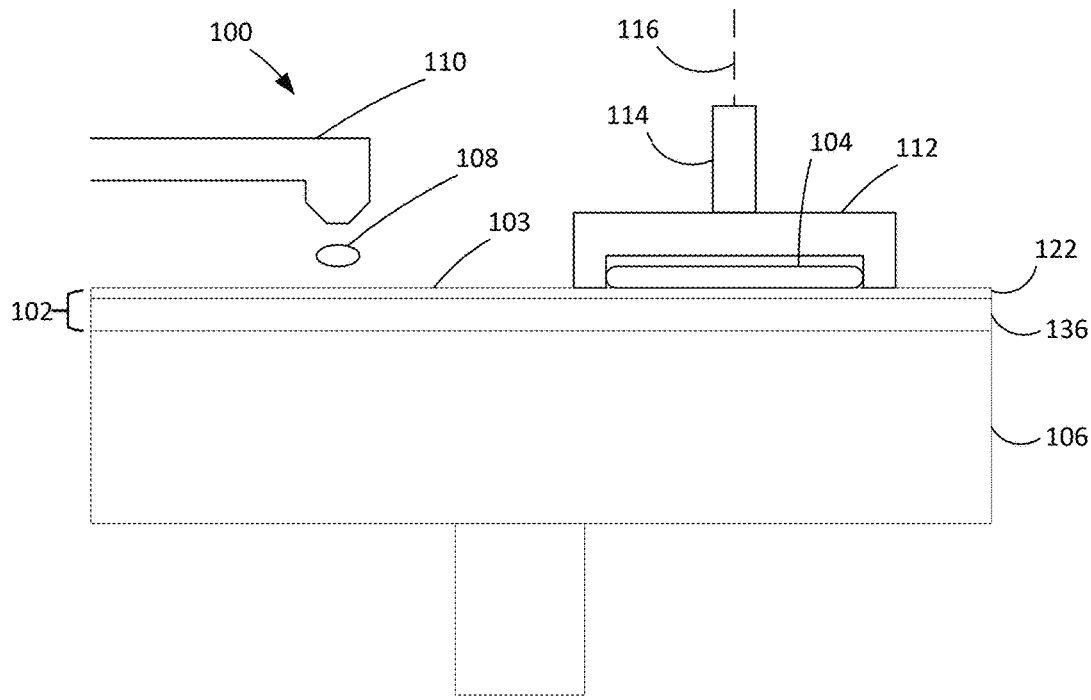
FIG. 1 is a schematic side view of a polishing system.

Turning now to FIG. 1, a polishing system 100 includes a polishing pad 102 that can be used to polish one or more substrates 104. The polishing system 100 can include a rotatable platen 106 on which the polishing pad 102 is placed. During a polishing step, a polishing liquid 108, e.g., abrasive slurry, can be supplied to a polishing surface 103 of polishing pad 102 by a slurry supply port or combined slurry/rinse arm 110. The polishing liquid 108 can contain abrasive particles, a pH adjuster, or chemically active components.

The substrate 104 is held against the polishing pad 102 by a carrier head 112. The carrier head 112 is suspended from a support structure, such as a carousel, and is connected by a carrier drive shaft 114 to a carrier head rotation motor so that the carrier head can rotate about an axis 116. The relative motion of the polishing pad 102 and the substrate 104 in the presence of the polishing liquid 108 results in polishing of the substrate 104.

Figure 2:
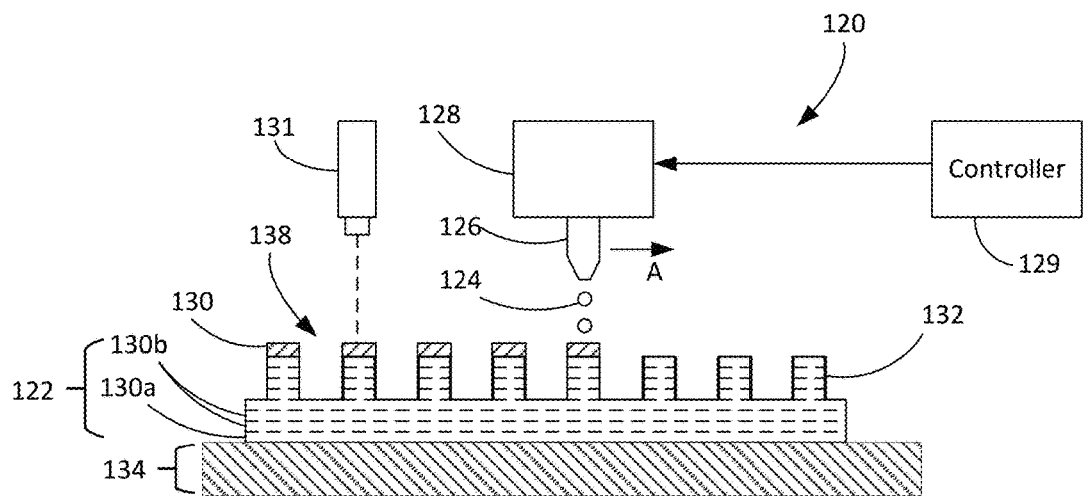
FIG. 2 is a schematic side view of an additive manufacturing apparatus.

Referring to FIG. 2, in some examples, an additive manufacturing apparatus 120 that dispenses successive layers of feed material can be used to form the polishing pad 102. Referring to FIGS. 1 and 2, the additive manufacturing apparatus 120 is operated to form at least a polishing layer 122 of the polishing pad 102. In the manufacturing process, thin layers of feed material are progressively dispensed and cured. For example, droplets 124 of feed material, e.g., polishing pad precursor material, can be ejected from a nozzle 126 of a dispenser 128, e.g., a droplet ejector printer, to form a layer 130 of the feed material. The dispenser 128 is similar to an inkjet printer, but uses the feed material for forming the polishing pad 102 rather than ink.

A controller 129 is operable to control dispensing operations of the dispenser 128 and, if applicable, control curing operations using an energy source 131 such as a lamp or a laser. The nozzle 126 is translated (shown by arrow A) across a support 134 to dispense feed material at any portion of a build area on the support 134.

In some implementations, the energy source 131 trails the nozzle 126 as the nozzle 126 is translated across the support 134, such that feed material dispensed through the nozzle 126 can be immediately cured. In some implementations, the energy source 131 leads the nozzle 126 as the nozzle 126 is translated across the support 134 in a first scanning direction while dispensing feed material. The energy source 131 can cure this dispensed feed material as the energy source 131 is scanned across the support 134, e.g., in a second scanning direction opposite the first scanning direction, thereby providing the feed material additional time to reach a stable state before being exposed to radiation of the energy source 131. In some implementations, the energy source 131 leads the nozzle 126 as the nozzle 126 is translated across the support 134 in a first scanning direction, and the energy source 131 is used to cure the dispensed feed material as the energy source is scanned in the first scanning direction. Thus, the previously dispensed layer of feed material can be cured almost immediately before another layer is dispensed through the nozzle 126. In some implementations, there are multiple energy sources, with an energy source 131 that trails the nozzle 126 and an energy source 131 that leads the nozzle 126.

For a first layer 130a deposited, the nozzle 126 can eject the feed material onto the support 134. For subsequently deposited layers 130b, the nozzle 126 can eject onto already solidified feed material 132. After each layer 130 is solidified, a new layer is then deposited over the previously deposited layer until the full 3-dimensional polishing layer 122 is fabricated. Each layer is applied by the nozzle 126 in a pattern stored in a 3D drawing computer program that runs on a computer. Each layer 130 is less than 50% of the total thickness of the polishing layer 122, e.g., less than 10%, e.g., less than 5%, e.g., less than 1%.

The polishing layer 122 can be formed on a support 134. In some examples, the support 134 includes a rigid base, or includes a flexible film, e.g., a layer of polytetrafluoroethylene (PTFE). If the support 134 includes a flexible film, then the support 134 forms a portion of the polishing pad 102. For example, the support 134 can include a backing layer 136 (shown in FIG. 1) of the polishing pad 102 or a layer between the backing layer and the polishing layer 122. If the support 134 includes the backing layer 136 of the polishing pad 102, the support 134 is not removed from the polishing pad 102 after manufacturing of the polishing pad 102 is complete. Referring to FIG. 1, the polishing pad 102 is mounted to the polishing system 100 with the backing layer 136 (e.g., the support 134) facing the rotatable platen 106.

If the support 134 does not include the backing layer 136 of the polishing pad 102, the polishing layer 122 can be removed from the support 134 after manufacturing of the polishing pad 102 is complete. In some implementations, the support 134 can include a rigid base that is covered by a protective film. The polishing pad 102 can be fabricated on the protective film. Thereafter, the protective film can be replaced on the rigid base, and a new polishing pad fabricated on the new protective film. The protective film can be removed from the polishing pad, e.g., the protective film can remain on the rigid base as the polishing pad is removed, or the protective film can detach from the rigid base and then be peeled off the polishing pad.

Solidification of the layers 130 of feed material can be accomplished by polymerization. For example, the layer 130 of feed material can be a monomer, and the monomer can be polymerized in-situ by ultraviolet (UV) curing. The feed material can be cured effectively immediately upon depositing, or an entire layer 130 of pad precursor material can be deposited and then the entire layer 130 be cured simultaneously. Alternatively, the droplets 124 can be a polymer melt that solidifies upon cooling. In further implementations, the apparatus 120 creates the polishing layer 122 by spreading a layer of powder and ejecting droplets of a binder material onto the layer of powder. In this case, the powder could include additives, e.g., abrasive particles.

In some implementations, the backing layer 136 can also be fabricated by a 3D printing process. For example, the backing layer 136 and polishing layer 122 could be fabricated in an uninterrupted operation by the apparatus 120. The backing layer 136 can be provided with a different hardness than the polishing layer 122 by using a different amount of curing, e.g., a different intensity of UV radiation, or by using a different material. In other implementations, the backing layer 136 is fabricated by a conventional process and then secured to the polishing layer 122. For example, the polishing layer 122 can be secured to the backing layer 136 by a thin adhesive layer, e.g., as a pressure-sensitive adhesive.

Figure 3A:
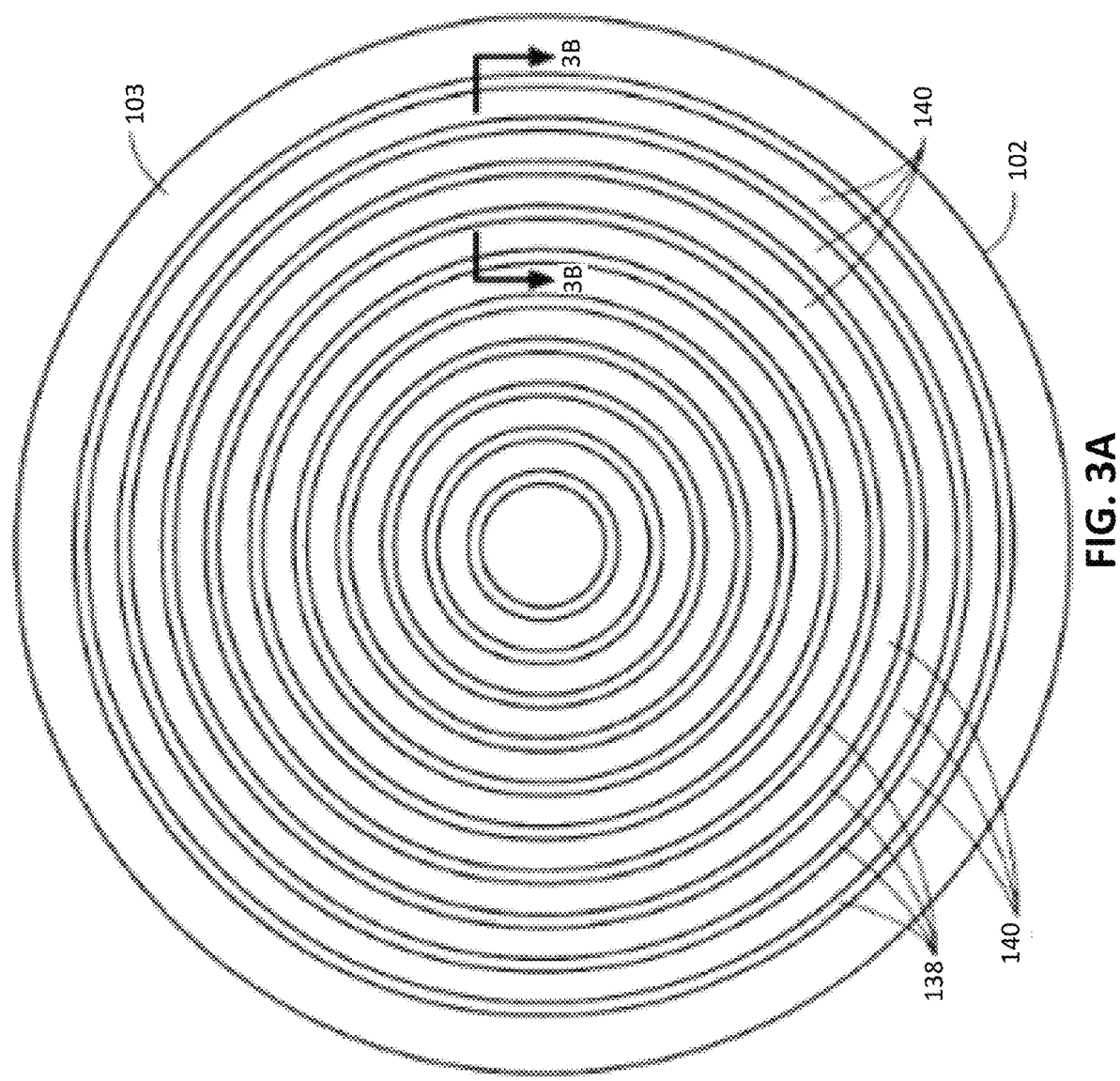
FIG. 3A is a top view of an example of a polishing pad.
Figure 3B:
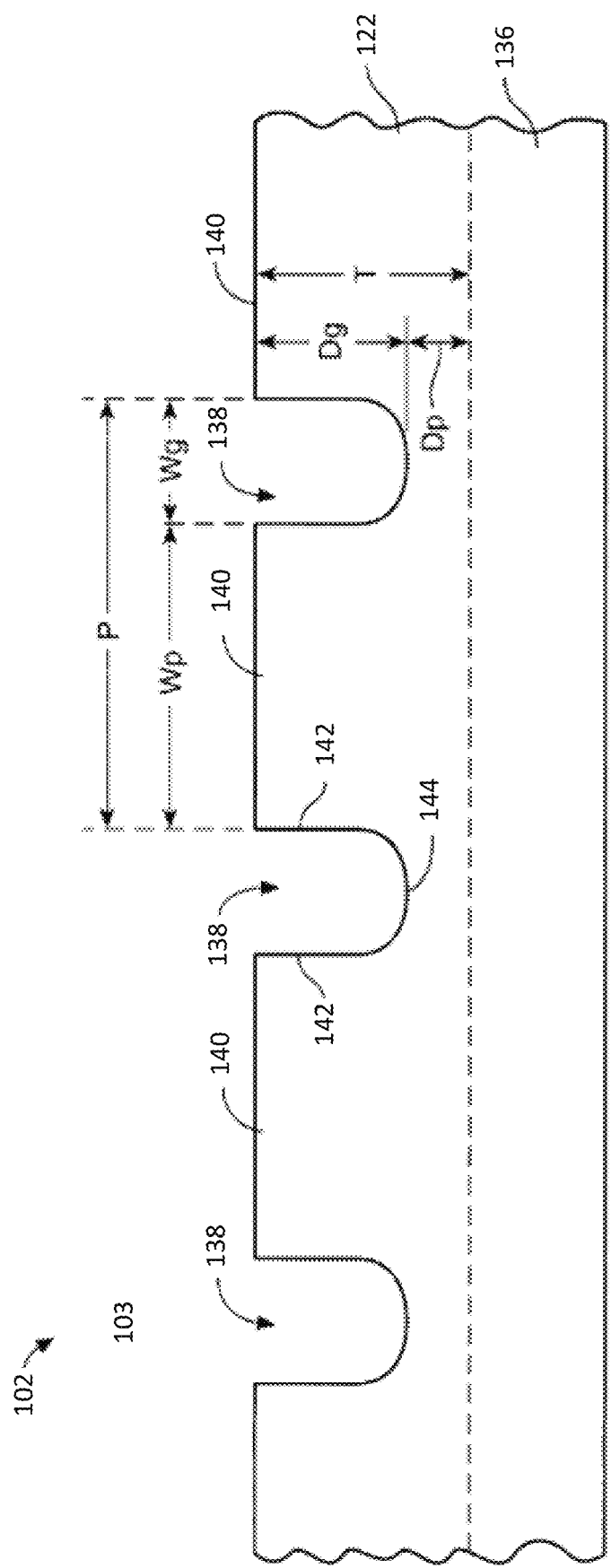
FIG. 3B is a side view of the polishing pad of FIG. 3A.

In some implementations, referring to FIGS. 2, 3A, and 3B, when the polishing layer 122 is formed, the apparatus 120 can selectively dispense and/or selectively cure portions of the feed material to form grooves 138 in the polishing layer 122. The grooves 138 can carry the polishing liquid 108 (shown in FIG. 1). The grooves 138 may be of nearly any pattern, such as concentric circles, straight lines, crosshatching, spirals, and the like. Assuming grooves are present, partitions 140 between the grooves 138 define the polishing surface 103. The polishing surface 103, e.g., including the partitions 140 between the grooves 138, can be about 25-90%, e.g., 70-90%, of the total horizontal surface area of the polishing pad 102. Thus, the grooves 138 can occupy 10%-75%, e.g., 10-30%, of the total horizontal surface area of the polishing pad 102. The partitions between the grooves 138 can have a lateral width of about 0.1 to 2.5 mm.

Referring to examples illustrated in FIGS. 3A and 3B, in some implementations, the grooves 138 include concentric circular grooves. These grooves 138 can be uniformly spaced with a pitch P. The pitch P is the radial distance between adjacent grooves 138. The partitions 140 between the grooves 138 have a width $W_p$. Each groove 138 are defined by side walls 142 extending from a bottom surface 144 of the groove 138 and terminate in at the polishing surface 103, e.g., at the partition 140. Each groove 138 may have a depth $D_g$ and a width $W_g$.

The side walls 142 can extend downwardly from and be generally perpendicular to the polishing surface 103. In this regard, the side walls are substantially perpendicular to the layers 130 of feed material dispensed on the support 134. In addition, the partitions 140 extend substantially parallel to the layers 130 of feed material dispensed on the support 134.

Each polishing cycle results in wear of polishing pad 102, generally in the form of thinning of the polishing pad 102 as the polishing surface 103 is worn down. The width $W_g$ of a groove with substantially perpendicular side walls 142 does not change as the polishing pad is worn. Thus, the generally perpendicular side walls 142 ensure that the polishing pad 102 has a substantially uniform surface area over its operating lifetime. As described herein, the manufacturing process to form the polishing pad 102 can include compensatory operations to prevent the polishing surface 103 from being nonplanar, e.g., to ensure planarity or flatness of the polishing surface 103, and to fabricate the side walls 142 as perpendicular to the polishing surface 103.

The grooves 138 can have a minimum width $W_g$ of about 0.34 mm. Each groove 138 can have a width $W_g$ between 0.34 mm and 2.71 mm, e.g., between about 0.38 mm and 1.02 mm. Specifically, the grooves 138 may have a width $W_g$ of approximately 0.51 mm or 0.68 mm. The pitch P between the grooves 138 may be between about 0.68 and 6.10 mm, e.g., between about 2.29 mm and 5.40 mm. Specifically, the pitch may be approximately 2.03 or 3.05 mm. Each partition 140 between the grooves 138 may have a width $W_p$ of at least 0.34 mm. The ratio of groove width $W_g$ to partition width $W_p$ may be selected to be between about 0.10 and 0.4. The ratio may be approximately 0.2 or 0.3.

In some implementations, if the polishing pad 102 includes the backing layer 136, the grooves 138 can extend entirely through the polishing layer 122. In some implementations, the grooves 138 can extend through about 20-80%, e.g., 40%, of the thickness of the polishing layer 122. The depth $D_g$ of the grooves 138 can be 0.25 to 1 mm. The polishing layer 122 can have a thickness T between about 1 mm and 3 mm. The thickness T should be selected so that the distance $D_p$ between the bottom surface 144 of the groove 138 and the backing layer 136 is between about 0.5 mm and 4 mm. Specifically, the distance $D_p$ may be about 1 or 2 mm.

Figure 4:
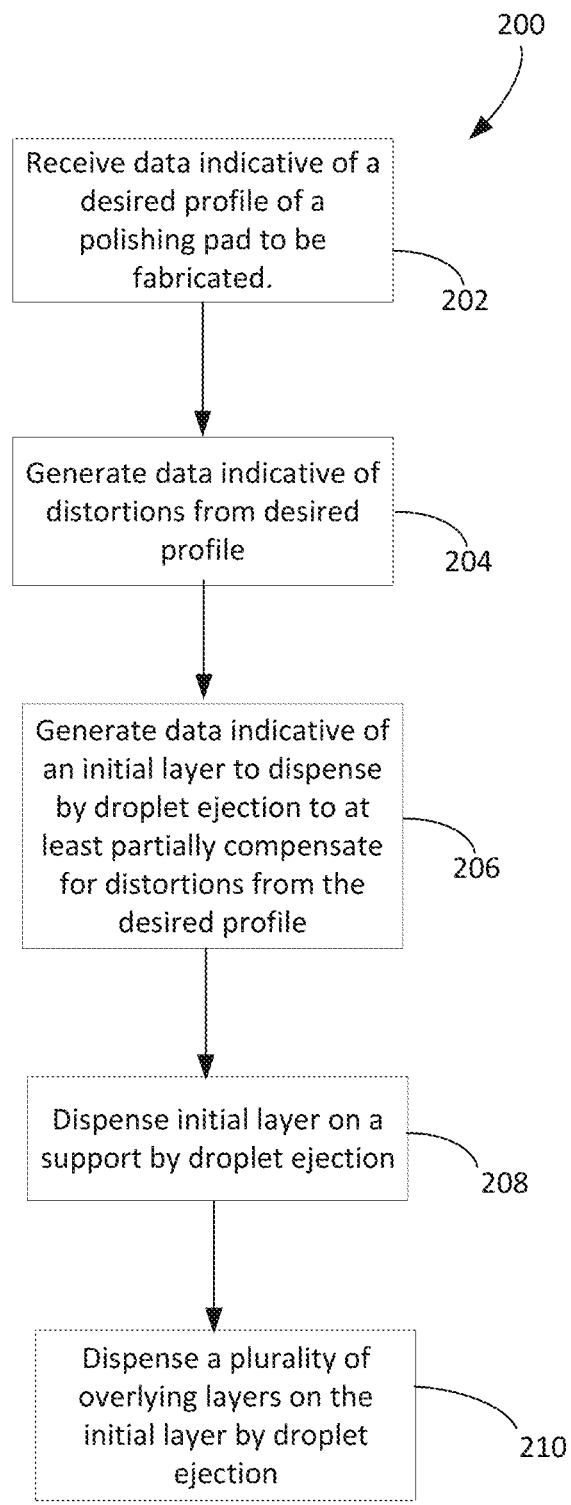
FIG. 4 is a flowchart of a process to form an article.

Referring to FIG. 4, a manufacturing process 200 to form the polishing pad 102 is illustrated. For example, the additive manufacturing apparatus 120, including the controller 129, can perform operations the manufacturing process 200.

Data indicative of a desired shape of the polishing pad 102 to be fabricated is received (202). Data indicative of shapes, including the data indicative of the desired shape, can be defined by a two-dimensional or three-dimensional bitmap. For example, each bit can indicate whether material should be present in a corresponding voxel in the object. In some implementations, the shape data includes data representing a computer-aided design (CAD) model. For example, if the shape data corresponds to the data indicative of the desired shape, the CAD model can be representative of the polishing pad 102 to be fabricated.

Figure 5:
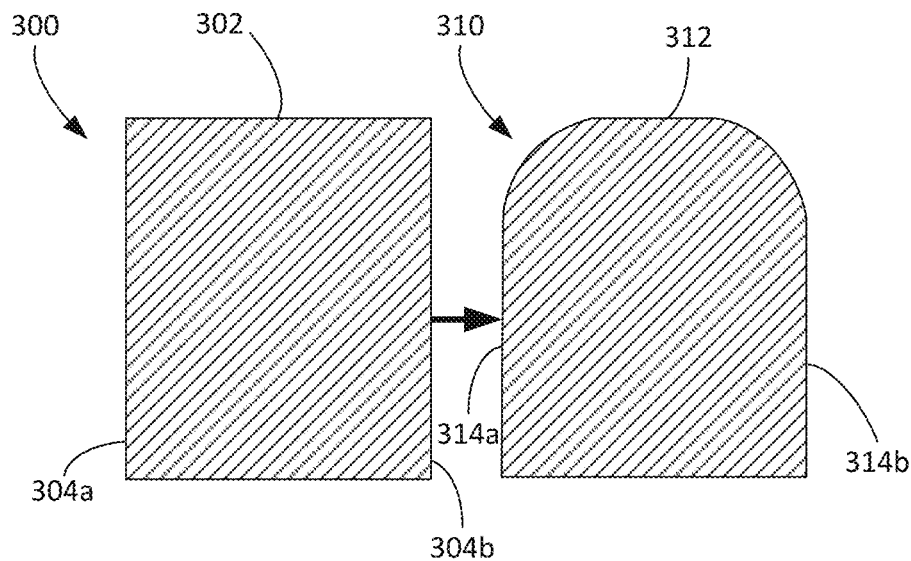
FIG. 5 illustrates an example of an actual shape formed based on a desired shape.

In some examples, referring to FIG. 5, the desired shape includes a desired feature 300. Absent further manipulation of the data indicative of the desired shape, when the additive manufacturing apparatus 120 forms the desired shape, e.g., dispenses the feed material and cures or allows the feed material to cure to form the desired shape, an actual feature 310 may be formed based on the data indicative of the desired shape including the desired feature 300. For example, to form the rectangular desired feature 300, the dispenser 128 is controlled to dispense parallel layers 130 of feed material. For each layer, a selected portion of feed material having a uniform width corresponding to a width of the rectangular desired feature 300 is cured. The recesses, e.g., grooves, can be provided by simply not dispensing any feed material into the corresponding regions on the object, e.g., the polishing pad.

During this dispensing and curing process, material properties of the feed material and the depositing technique of the additive manufacturing apparatus 120 can cause edges of the actual feature 310 to become undesirably rounded or beveled. In particular, if the layers 130 of feed material are dispensed in accordance to an original pattern determined based on the data indicative of the desired shape, the resulting shape includes rounding or beveling as depicted with respect to the actual feature 310.

For example, as shown in FIG. 5, while a top surface 302 of the desired feature 300 is planar, a corresponding top surface 312 of the actual feature 310 is nonplanar. Due to a beveling effect on the top surface 312, lateral edges 304a, 304b of the desired feature 300 have a greater length than actual lateral edges 314a, 314b of the actual feature formed by the additive manufacturing apparatus 120. The desired feature 300 can correspond to the partitions 140 between the grooves 138 (shown in FIGS. 3A and 3B). In this regard, the rounding or beveling effect on the top surface 312 can cause the polishing surface 103 defined by the partitions 140 to become nonplanar. Without being limited to any particular theory, the liquid droplets of feed material, e.g., the liquid pad precursor material, ejected onto the previously deposited layer can spread and run down the sides of the feature 300, e.g., due to wetting, resulting in the rounding.

Referring back to FIG. 4, data indicative of the distortions from the desired profile (caused by a dispensing of multiple layers by droplet ejection by the additive manufacturing system) is generated (204). That is, an expected distortion profile is produced. To reduce the rounding or beveling effect (that which is predicted with the expected distortion profile), the data indicative of the desired shape can be modified. In this regard, data indicative of a modified pattern of dispensing feed material to compensate for polishing pad distortions is generated or received (206). The distortions include distortions of the polishing surface 103 of the polishing pad 102. These distortions, in some cases, are caused by the additive manufacturing apparatus 120, as described herein. The modified pattern differs from the original pattern of dispensing the feed material in that the modified pattern accounts for the distortions in the actual feature 310 relative to the desired feature. In this regard, in some implementations, the data indicative of the modified pattern is determined based on relative differences between the actual feature 310 and the desired feature 300.

Figure 6:
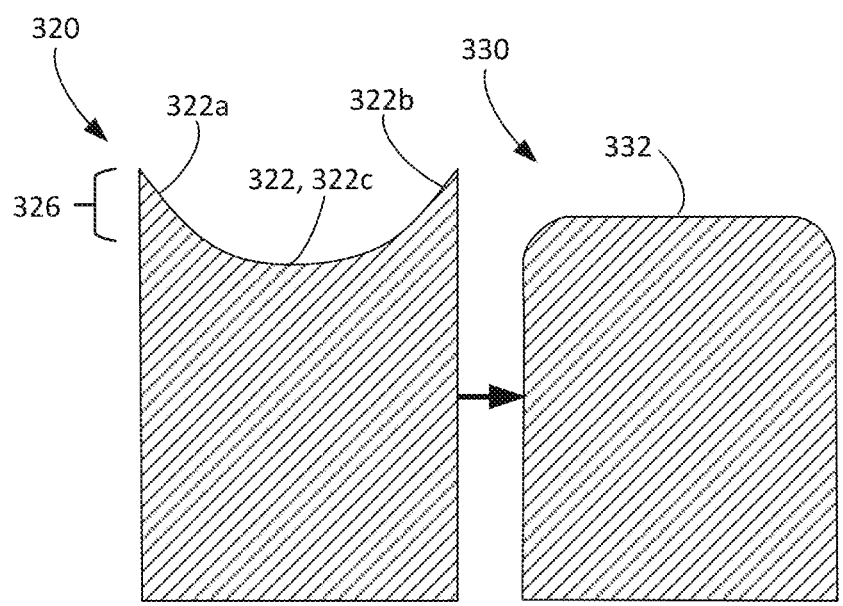
FIG. 6 illustrates an actual shape formed based on modification of the desired shape of FIG. 5.

For example, as shown in FIG. 6, the data indicative of the modified shape includes data indicative of a modified feature 320. Even though the top surface 302 of the desired feature 300 is planar, a top surface 322 of the modified feature 320 is nonplanar to compensate for the distortions of the top surface 312 of the actual feature 310 formed from the original pattern. The modified feature 320 is determined based on relative differences between the desired feature 300 and the actual feature 310. The top surface 322 of the modified feature 320 is concave to compensate for the convexity of the top surface 312 of the actual feature 310. In this regard, the data indicative of the modified shape is determined based on a combination of the data indicative of the desired shape and data indicative of the actual shape formed using the original pattern.

Referring back to FIG. 4, an initial layer of the feed material is dispensed by droplet ejection in accordance to a modified pattern (208). A resulting actual feature 330 is formed based on data indicative of the modified pattern to dispense the feed material, the modified pattern being determined based on the data indicative of the modified shape.

When the dispenser 128 is controlled to dispense the layers 130 of feed material in accordance to the data indicative of the modified pattern (210), a size and shape of a selected portion of the layers 130 of feed material that is cured can vary through a height of the feature. This is in contrast to the process to form the actual feature 310 in which the selected portion of cured feed material is consistent from layer to layer because the width of the desired feature 300 is consistent from layer to layer.

The modified feature 320 includes a concave portion 326 having a width that varies from layer to layer. A modified pattern to dispense the feed material to form the concave portion 326 differs from the corresponding portion of the original pattern to form the top portion of the desired feature 300 in that the selected cured portions of the layers 130 of feed material for the modified pattern have varying widths and shapes. These varying widths and shapes compensate for the distortions present in the actual feature 310 such that the resulting actual feature 330 formed using the modified pattern has reduced convexity compared to the actual feature 310 formed using the original pattern. For example, a top surface 332 of the actual feature 330 has increased planarity and flatness compared to the top surface 312 of the actual feature 310. By intentionally controlling where feed material is being dispensed and cured, this correction defined by the modified pattern can better match the shape of the resulting polishing pad 102 to the original desired shape for the polishing pad 102.

For example, the controller 129 can receive an initial data object, e.g., a computer aided design (CAD)-compatible file, e.g., a bitmap, that specifies the initial or intended shape of the object to fabricated. The data object can be stored on a non-transitory computer readable medium. The controller 129 can be programmed to generate a modified data object, e.g., a modified bitmap, that includes a feature to reduce rounding or beveling. The modified data object can be based on the intended shape as indicated by the initial data object as well as data indicating variations from the intended shape that are introduced by the additive manufacturing procedure. Thus, when the polishing pad 102 is fabricated using the modified data object, e.g., the modified bitmap, it more closely matches the desired design.

Figure 7:
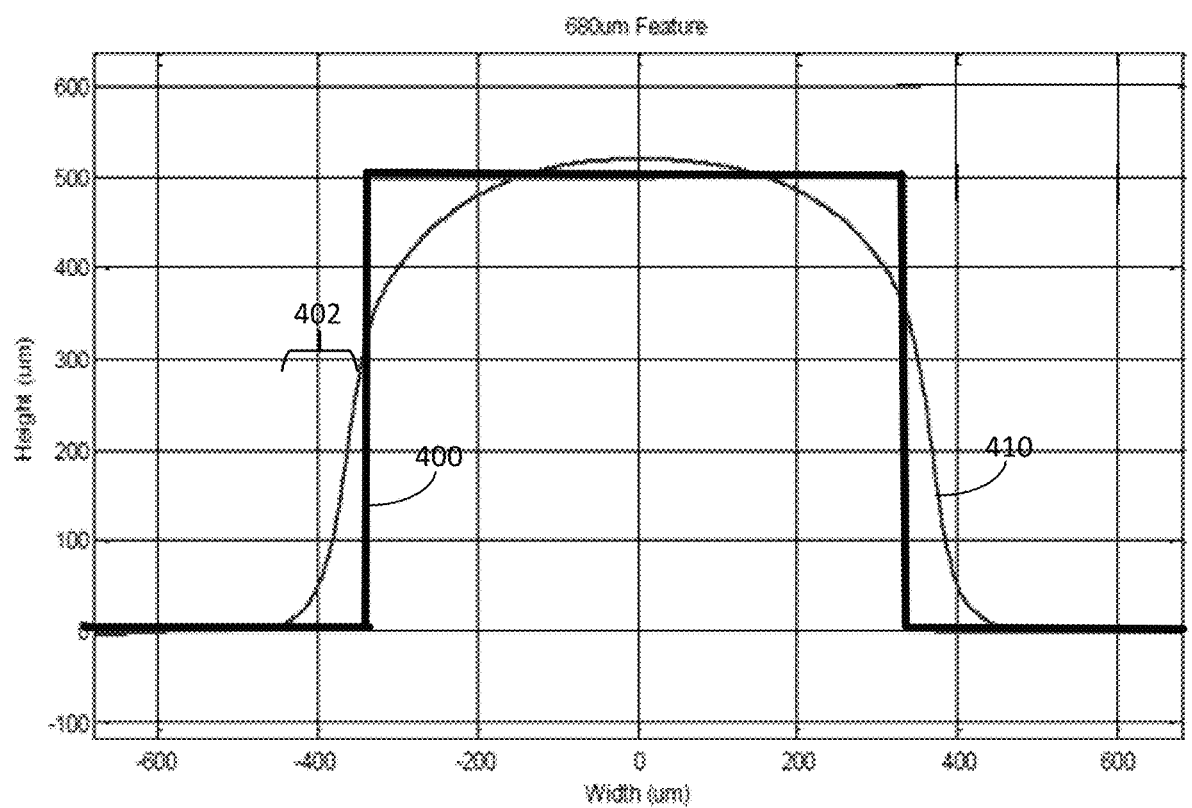
FIG. 7 illustrates another example of an actual shape formed based on a desired shape.

FIG. 7 illustrates another example of a desired feature 400 and an actual feature 410 formed based on dispensing and curing patterns determined in accordance to the data indicative of the desired feature 400. In this particular example, the desired feature 400 had a width of 680 µm and a height of 500 µm, although other dimensions are appropriate in an implemented process. As illustrated, the actual feature 410 had a non-planar top surface and slanted side walls.

The desired feature 400 is a constant width feature, e.g., the partition 140 separating the grooves 138 of the polishing pad 102. A constant width of the partitions 140 can improve wafer-to-wafer polishing uniformity. Furthermore, the polishing efficacy of the polishing pad 102 can be dependent on planarity of the polishing surface 103. Using the processes described herein, data indicative of a modified pattern can be generated so that the resulting actual feature formed using the modified pattern more closely matches the desired feature 400. In particular, the modified pattern corresponds to the original pattern with an additional correction profile determined using processes described herein. The additional correction profile compensates for the distortions of the actual feature 410 formed using the original pattern.

Figure 8A:
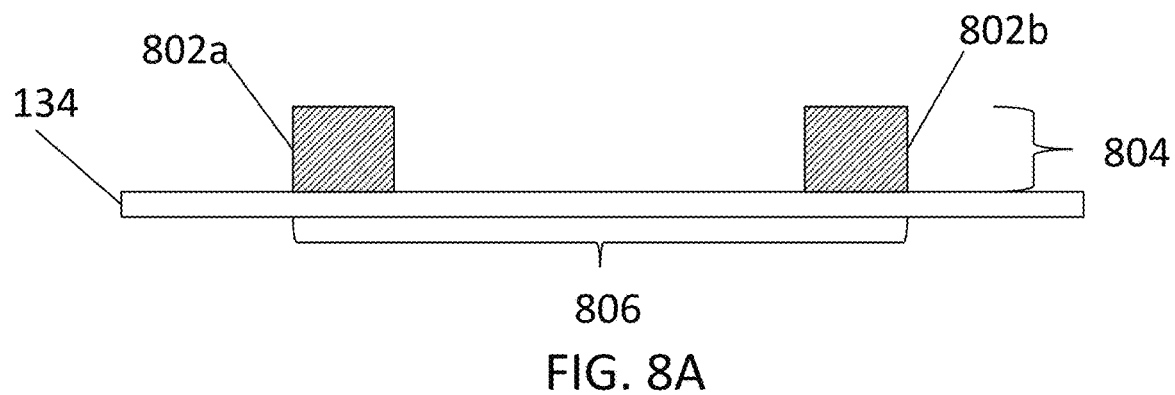
FIGS. 8A-8D are side view representations of an example pattern and method for depositing.
Figure 8B:
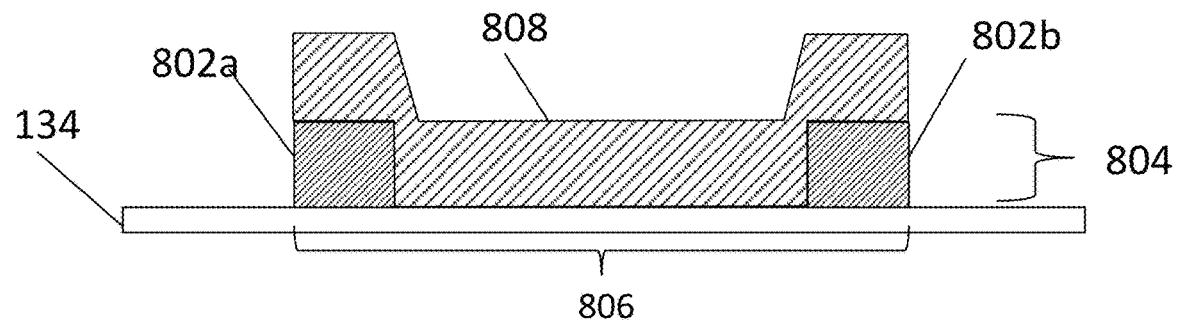
Figure 8C:
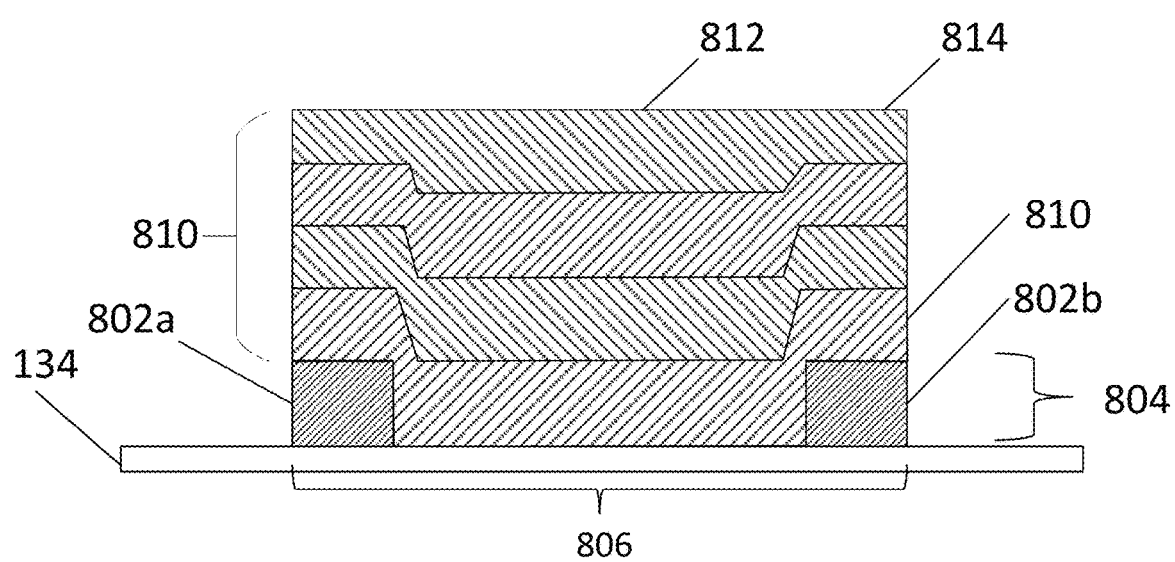

The examples of FIGS. 8A-8C are cross-sections of the layers dispensed and cured by the manufacturing apparatus 120. In some implementations, the data indicative of the shapes described herein include bitmap representations of the shapes to be formed or the shapes formed. Each bit of the bitmap can correspond to a voxel of a feature of the polishing pad 102 to be formed.

For example, FIG. 8A illustrates first layer 804 to be deposited to form the desired feature 400. To compensate for distortion, two outer regions of a partition 806 along two opposite edges of the feature are dispensed and deposited to form a perimeter of the partition 806. The two outer regions can be defined by a first set of voxels 802a that provide a first region adjacent the first edge, and second set of voxels 802b that provide a second region adjacent the second edge.

As illustrated by FIG. 8B, after curing the first edge 802a and the second edge 802b, a successive layer 808 is deposited atop the initial layer 804. The successive layer 808 has sufficient material to fill in the remaining portion of the partition 806 between the first set of voxels 802a and the second set of voxels 802b that provide the edges, and deposit an additional layer atop the first set of voxels 802a and the second set of voxels 802*b*. The concave shape that is formed at least partially compensates for distortions to the desired feature caused by the depositing the plurality of successive layers.

As illustrated by FIG. 8C, after depositing a plurality of successive layers 810, the resulting feature, e.g., the partition 806, can have a top surface 812 with edges 814 that are less subject to rounding and/or other forms of distortion.

The initial data object need not include the initial layer, whereas the modified data object includes the initial layer. In particular, the controller can determine the distortions that would occur to the object being fabricated, and then generate the initial layer to compensate for these distortions. For example, the controller can identify regions expected to be thin relative to the desired profile. These regions can be made thicker by assigning voxels corresponding to the regions to the initial layer.

Alternatively, the initial data object might include an initial layer, whereas the modified data object includes a modified initial layer. For example, regions that are expected to be thin relative to the desired profile can be made thicker by modifying voxels corresponding to the regions in the initial layer to deposit more material so as to make the initial layer thicker in those regions.

In some implementations, the second layer 808 can be formed by a different, second droplet ejection process. For example, the first layer 804 can be formed by ejection of droplets of a first composition and the second layer can be formed by ejection of droplets of a different second composition. For example, the first material can be a first polymer, whereas the second layer 808 can be a second polymer. The first material can be a composition that cures faster than the second material in otherwise similar environmental conditions.

As another example, depositing the first layer 804 can include applying a first curing radiation to the first layer 804, whereas depositing the second layer 808 can include applying second curing radiation that cures the second layer 808 slower than the first curing radiation cures the first layer 804. In some implementations, the first curing radiation and the second curing radiation have different wavelengths, different intensities, or different delays between ejection of the droplet and application of the respective curing radiation.

Figure 8D:
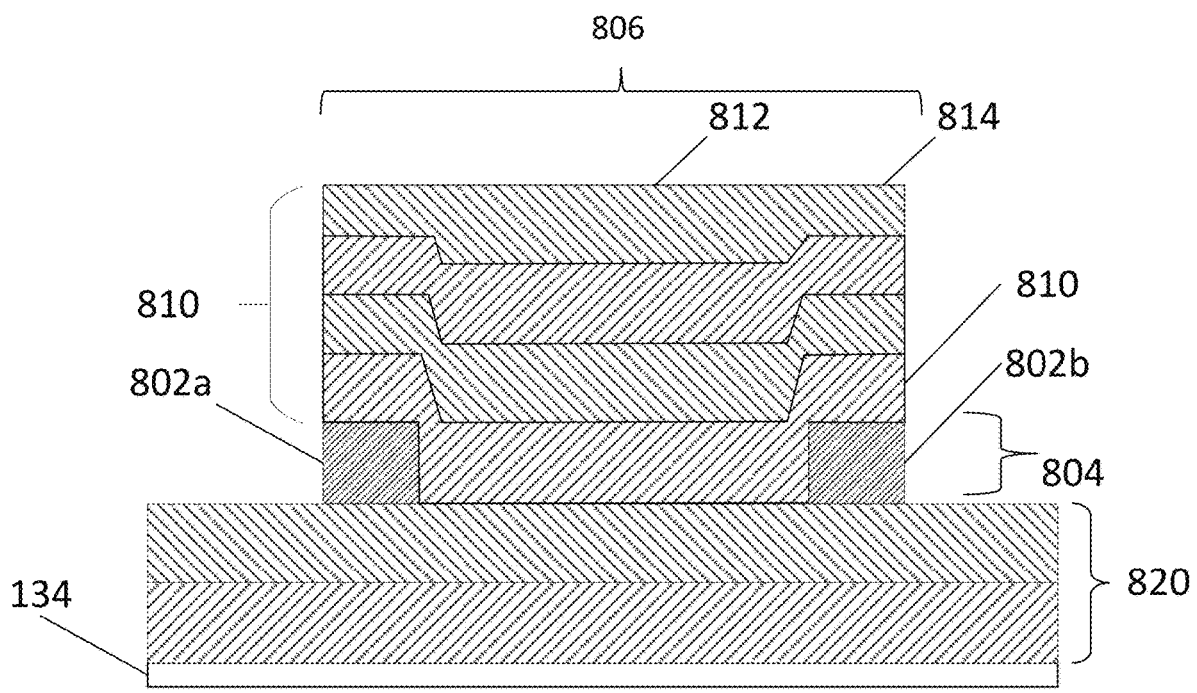

Although FIGS. 8A-8C illustrate the first layer 804 as deposited directly on the support 134, as shown in FIG. 8D, the first layer 804 could be formed over a plurality of layers 820 that form the body of the object being fabricated, e.g., the main body of the polishing pad. In this case, the first layer 820 is the first layer of the feature, e.g., the partition, that projects above the main body. In this case, the layer 804 still is located at the perimeter of the partition 806.

Figure 9A:
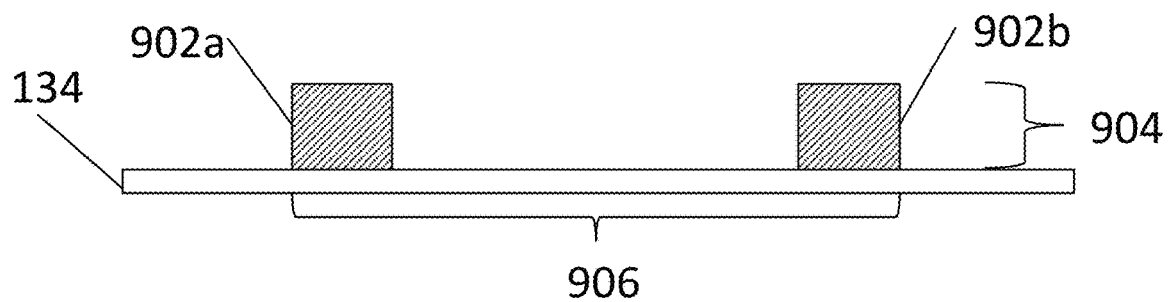
FIGS. 9A-9E are side view representations of an example pattern and method for depositing.
Figure 9B:
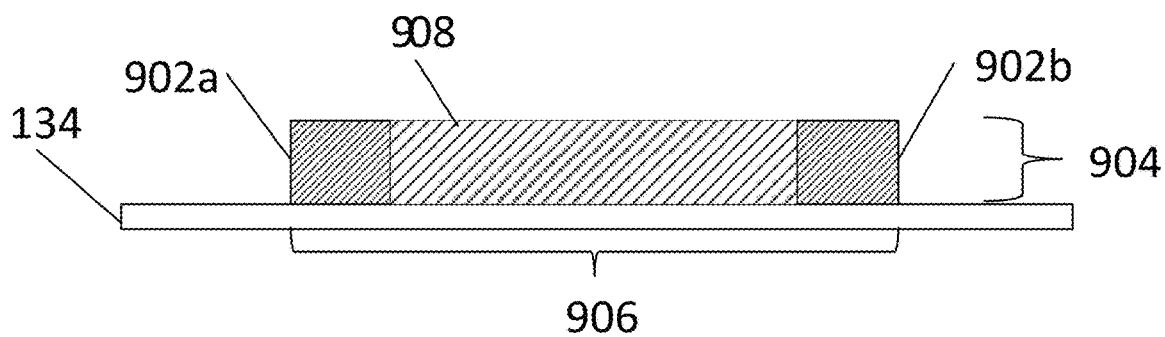
Figure 9C:
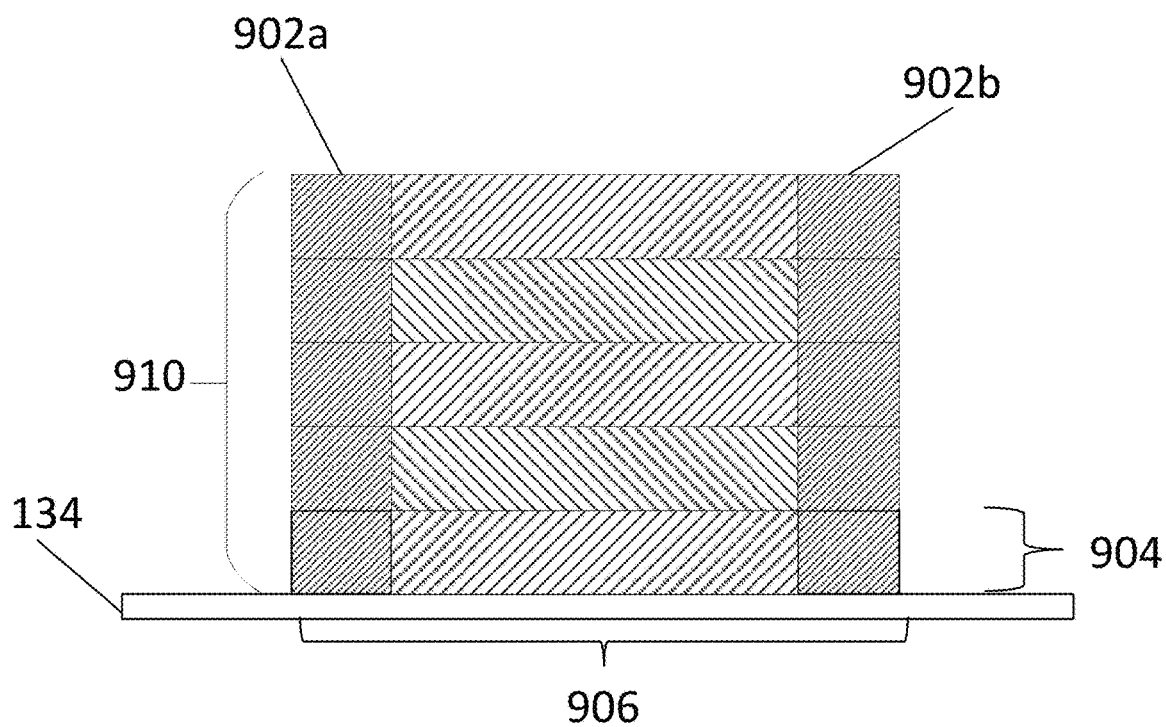

The examples of FIGS. 9A-9C are cross-sections of the layers dispensed and cured by the additive manufacturing apparatus 120. In some implementations, the data indicative of the shapes described herein include bitmap representations of the shapes to be formed or the shapes formed. Each bit of the bitmap can correspond to a voxel of a feature of the polishing pad 102 to be formed.

For example, FIG. 9A illustrates first layer 904 to be deposited to form the desired feature 400. To compensate for distortion, two outer regions, including a first region adjacent the first edge and a second region adjacent the second edge, are dispensed and deposited to form a perimeter of a partition 906. A first set of voxels 902*a* can provide the first region and a second set of voxels 902*b* can provide the second region.

As shown in FIG. 9B, after curing the first set of voxels 902*a* and the second set of voxels 902*b*, a third set of voxels 908 is deposited between the boundary formed by the first layer 904. That is, the successive layer 908 has sufficient material to fill in the remaining portion of the partition 906 and deposit region between the first set of voxels 902*a* and the second set of voxels 902*b*. In this example, little to no concave shape is formed. Instead, the edge portions (902*a* and 902*b*) are formed by a process that better maintains verticality of the side wall. This at least partially compensates for distortions of the actual feature 410. In effect, the edge portions (902*a* and 902*b*) serve as a wall to retain the remainder of the polishing pad precursor that will form a center portion of the partition 908.

In some implementations, the third set of voxels 908 may be deposited by a different, second droplet ejection process. For example, the first and second set of voxels 902*a* and 902*b* be may be formed using droplets of a material, such as a first polymer, that cures faster than a material, e.g., a second polymer, used for the droplet that form the third set of voxels 908.

In some implementations, depositing the first and second sets of voxels 902*a* and 902*b* can include a first curing radiation, while depositing the third set of voxels 908 can include a second curing radiation that cures the third set of voxels 908 slower than the first curing radiation cures first and second sets of voxels 902*a* and 902*b*. In such an implementation, the first curing radiation and the second curing radiation can be at different wavelengths or different intensities. The apparatus can include different energy sources, e.g., different UV lights, to provide the different wavelengths or intensities. Alternatively, the same energy source can driven at different power levels to provide the different intensities.

As shown in FIG. 9C, this process can be repeated until a plurality of successive layers 910 are deposited. The edge portions 902*a*, 902*b* serve to form a wall that provides the vertical outer surface of partition 906, with the interior portion of the partition provided by the third set of voxels 908. Assuming that the capture material is not removed and provides a part of the polishing pad, then the edge portions 902*a*, 902*b* would be regions inside and abutting a perimeter of the partitions. The controller can be programmed to determine these regions from a data file.

Figure 9D:
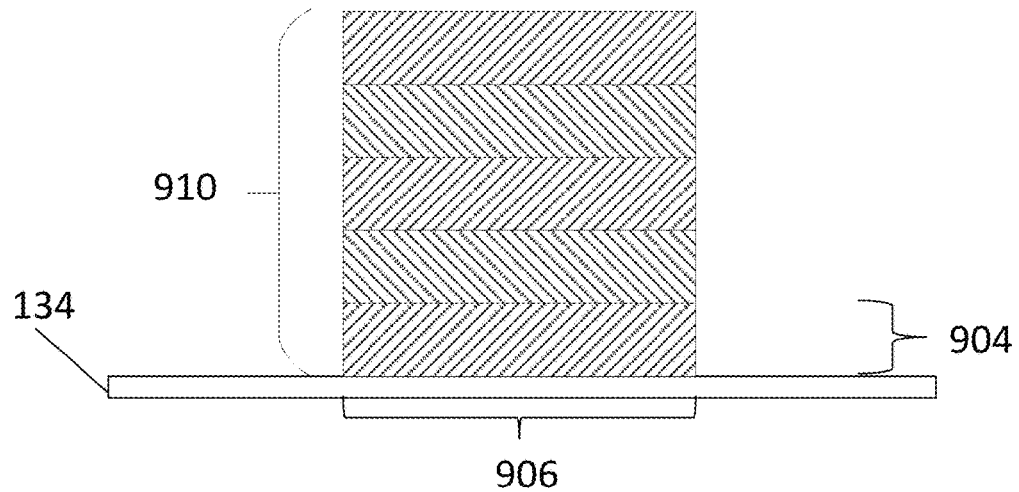

As shown in FIG. 9D, in some implementations, the capture material, i.e., the material of the first and second set of voxels 902*a* and 902*b*, can be removed, e.g., through a selective etching process. This leaves only the material of the third set of voxels 908 remaining. In this case, the edge portions 902*a*, 902*b* would be regions outside and abutting a perimeter of the partitions. Again, the controller can be programmed to determine these regions from a data file.

This technique can be advantageous if the third set of voxels 908 are formed of an optically transparent material, e.g., for the formation of a CMP window. This technique can also be advantageous for fixed abrasive, roll format pad designs. This technique can also be used for secondary polymer curing of the third set of voxels 908 where the materials of voxels 902*a* and 902*b* are used as masks.

In some implementations, at least the center portion of the partition, i.e., the third set of voxels, is subject to a secondary polymer curing process. The capture material, i.e., the material of the first and second set of voxels 902*a* and 902*b*, can be removed after the secondary curing.

Figure 9E:
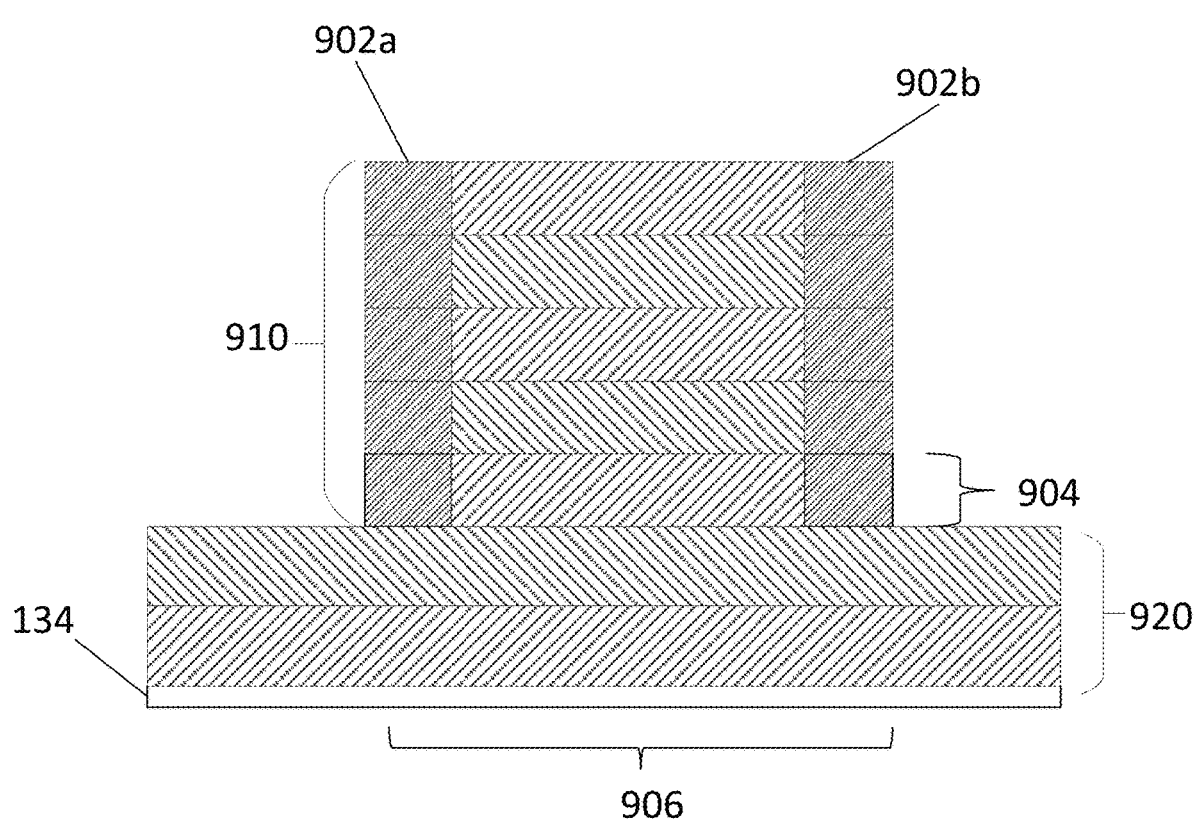

Although FIGS. 9A-9C illustrate the layers 910 as deposited directly on the support 134, as shown in FIG. 9E, the plurality of layers 910 that provide the partition can be formed over a plurality of layers 920 that form the body of the object being fabricated, e.g., the main body of the polishing pad. In this case, the first layer 904 is the first layer of the feature, e.g., the partition, that projects above the main body.

Figure 10:
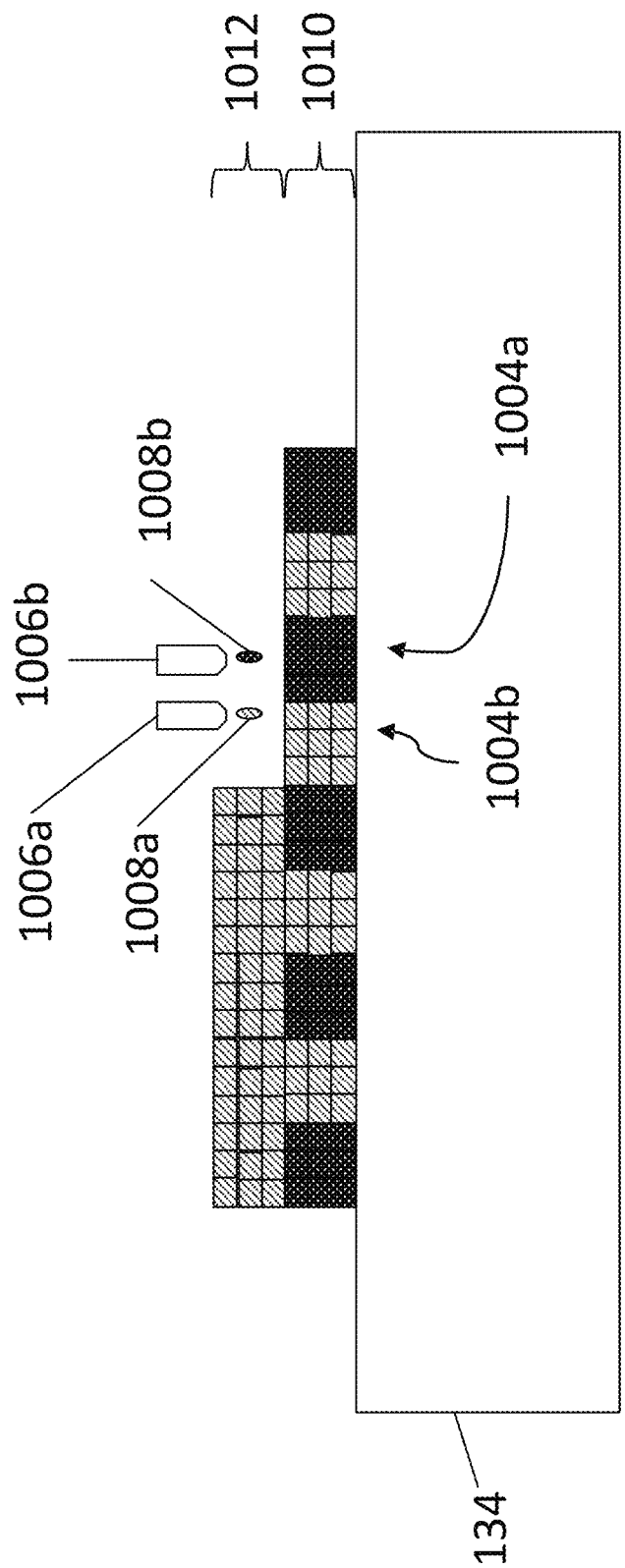
FIG. 10 is a schematic side view of another implementation of an additive manufacturing apparatus.

FIG. 10 illustrates an example process depositing a first set of successive layers 1010 by droplet ejection onto the support 134. Depositing the first set of successive layers 1010 involves dispensing a polishing pad precursor 1008a from a first ejector 1006a to first set of regions, such as region 1004b, corresponding to partitions of the polishing pad. In addition, depositing the first set of successive layers 1010 involves dispensing a sacrificial material 1008b from a second injector 1006b to a set of second regions, such as region 1004a, corresponding to grooves of the polishing pad. The first ejector 1006a and the second ejector 1006b can draw from different feed material sources. In particular, the sacrificial material 1008b can be deposited simultaneously with the pad pre-cursor 1008a. The simultaneous depositing allows an entire layer to be deposited with one pass of the first ejector 1006a and the second ejector 1006b. The sacrificial material 1008b at least partially reduced the distortion that can occur if the pad-precursor 1008a is deposited on its own by keeping the deposited pad pre-cursor 1008a in place before and during curing.

After the first set of successive layers 1010 is deposited, a second plurality of successive layers 1012 is deposited by droplet ejection over the first set of successive layers 1010. The second set of successive layers 1012 spans both the first regions 1004b and the second regions 1004a. In some implementations, some or all of the second set of successive layers 1012 correspond to a lower portion of the polishing layer of the polishing pad and are formed from the polishing pad pre-cursor 1008a. In some implementations, some or all of the second set of successive layers 1012 are formed to have a different material composition than the first set of successive layers 1010, and can correspond to a backing layer, e.g., a sub-pad, of the polishing pad. Such layers can be formed from a different material, e.g., a different precursor, or the same precursor can be ejected but treated differently, e.g., subjected to more or less curing to provide a different degree of polymerization and thus a different hardness.

In this implementation, the polishing pad is manufactured upside down. That is the uppermost layer of deposited material corresponds with a base, or lower portion, of the polishing pad. The first set of successive layers 1010 and the second set of successive layers 1012 provide a body of the polishing pad.

Once depositing of the polishing pad material is complete, the body of the polishing pad is removed from the support 134. The sacrificial material 1008b is removed from the body, e.g., by selectively etching the sacrificial material, or by lifting away the body of the polishing pad while the sacrificial material remains on the support, to provide the polishing pad having a polishing surface with partitions separated by grooves.

In some implementations, a third set of successive layers is deposited by droplet ejection over the second set of successive layers 1012. The third set of successive layers can have a different composition than the second set of successive layers 1012. The second set of successive layers 1012 can correspond to a lower portion of the polishing pad (also known as a sub-pad of the polishing layer).

Referring to FIG. 11A, in some implementations the top surface of the support 134 includes a texture, e.g., projections 1100, and the polishing pad precursor 1008 is ejected to fill the space between the projections so as to generate a complementary texture, e.g., the grooves, on the polishing pad. In particular, depositing a first set of successive layers 1110 involves dispensing a polishing pad precursor 1108 from an ejector 1106 to form the partitions first set of regions, such as region 1104, corresponding to partitions of the polishing pad. After the first set of successive layers 1110 is deposited, a second plurality of successive layers 1112 is deposited over the first set of successive layers 1010. The second set of successive layers 1112 spans both the first regions 1004 and the projections 1110.

In some implementations, some or all of the second set of successive layers 1112 correspond to a lower portion of the polishing layer of the polishing pad and are formed from the polishing pad pre-cursor 1008. In some implementations, some or all of the second set of successive layers 1112 are formed to have a different material composition than the first set of successive layers 1110, and can correspond to a backing layer, e.g., a sub-pad, of the polishing pad. Such layers from can be formed from a different material, e.g., a different precursor, or the same precursor can be ejected but treated differently, e.g., subjected to more or less curing to provide a different degree of polymerization and thus a different hardness.

Referring to FIG. 11B, rather than the texture being formed in the support 134, the texture can be provided by a film 1120 that is placed on the support 134. In this case, the polishing pad precursor is ejected onto the film 1120, and the film 1120 is removed from polishing pad after manufacture.

Figure 12:
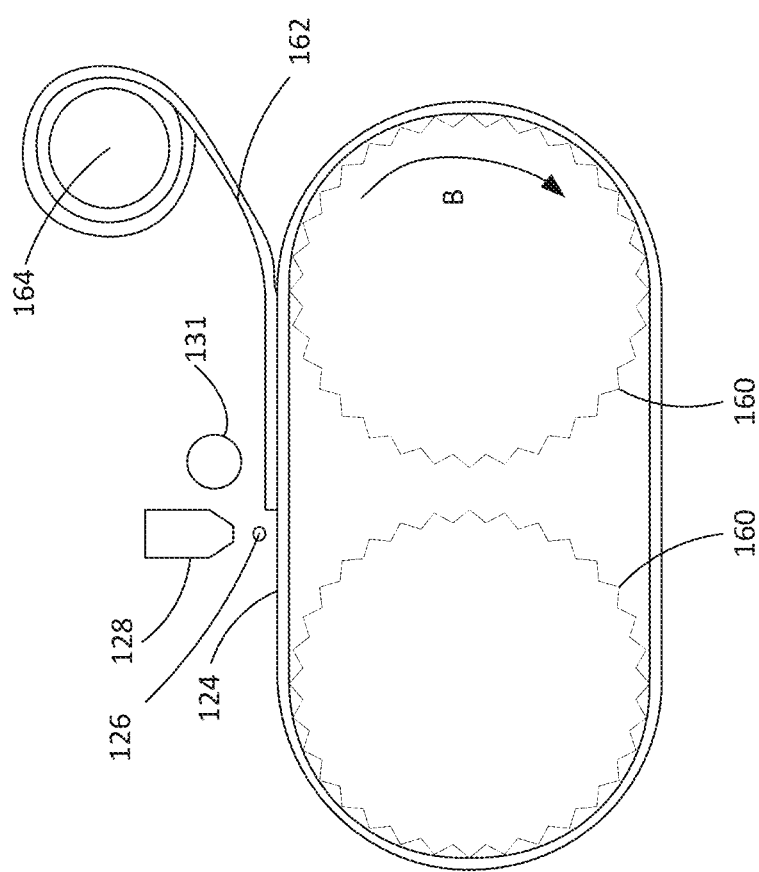
FIG. 12 is a schematic side view of another implementation of an additive manufacturing apparatus.

For any of the various implementations discussed above, instead of the dispenser 128 scanning over the support 134, the support can be moveable. For example, referring to FIG. 12, support 134 could be a continuous belt. The belt 134 can be driven by drive wheels 160 that are powered by one or more actuators to move the belt (as shown by arrow B) to carry the dispensed polishing pad precursor under the energy source 131 to cure the precursor to form the polishing pad as a sheet. Although only one dispenser 128 and energy source 131 are shown, there can be multiple dispensers and energy sources arranged in series along the belt 134 such that multiple layers can be formed in succession on the belt to form the full thickness of the polishing pad. The cured polishing pad sheet 162 can then be lifted from the belt 134 and wound around a receiving roller 164.

The controller, e.g., the controller 129, can be implemented in digital electronic circuitry, or in computer software, firmware, or hardware, or in combinations of them. The controller can include one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The controller 129 and other computing devices part of systems described can include non-transitory computer readable medium to store a data object, e.g., a computer aided design (CAD)-compatible file that identifies the pattern in which the feed material should be formed for each layer. For example, the data object could be a STL-formatted file, a 3D Manufacturing Format (3MF) file, or an Additive Manufacturing File Format (AMF) file. For example, the controller could receive the data object from a remote computer. A processor in the controller 129, e.g., as controlled by firmware or software, can interpret the data object received from the computer to generate the set of signals necessary to control the components of the additive manufacturing apparatus 120 to deposit and/or cure each layer in the desired pattern.

A number of implementations have been described. Nevertheless, it will be understood that various modifications may be made.

The approach shown in FIG. 6 is to deposit one or more additional layers of feed material to compensate for the height of the feature being less than desired. For example, one or more additional layers of feed material can be deposited in regions where rounding or beveling occurs. However, alternatively or in addition, the amount of feed material deposited in a layer can compensate for the height feature being less than desired. For example, the size of droplets or the number of droplets ejected can be increased for voxels located in regions where the height feature is less than desired, e.g., where rounding or beveling occurs.

In some implementations, a distribution of volume of the feed material is modified depending on a location at which the droplets 124 are to be dispensed. A volume of the droplets 124 of feed material is varied during the dispensing operation. For example, referring back to FIG. 6, the volume of the droplets 124 for forming edges 322a, 322b of the feature can be less than the volume of droplets 124 for forming the interior portion 322c of the feature. The controller 129 determines the appropriate weight for forming the edges 322a, 322b and the weight for forming the interior portion 322c based on the material properties of the feed material. The dispenser 128 can dispense less feed material to minimize roll off of the feed material. As the dispenser 128 moves to form the interior portion 322c of the feature, the volume of droplets is increased. In some implementations, the volume of the droplets 124 define a gradient from the edges 322a, 322b to the center of the feature. Depending on the wetting effect of the feed material, this type of volume control can be used to modulate an amount of feed material cured when the energy source 131, if present, is operated. For example, if the energy source 131 is scanned across the support 134 to cure different portions of the dispensed feed material, drop volume control can allow for less feed material to roll off for each pass of the energy source 131 while injecting more feed material at the edges 322a, 322b of the feature to reduce the beveling effect described herein.

In some implementations, multiple types of feed material are dispensed. The additive manufacturing apparatus 120 includes, for example, two or more dispensers, each dispenser dispensing a different type of feed material. In some cases, a single dispenser, e.g., the dispenser 128, receives multiple types of feed material and dispenses a mixture of the multiple types of feed material. Because properties of a first type of feed material may vary from properties of a second type of feed material, the modification to the original pattern to dispense the first type of feed material may include a greater or smaller amount of scaling than the modification to the original pattern to dispense the second type of feed material. Alternatively, if droplet weight is controlled, the weights of the droplets of the first type of feed material can be controlled to be higher or lower than the weights of the droplets of the second type of feed material. In some cases, the size of the droplets of the first type of feed material can be controlled to be larger or smaller than the sizes of the droplets of the second type of feed material.

In some implementations, multiple types of feed material form different portions of the polishing pad 102, for example, to form the polishing layer 122 and the backing layer 136, or to form different portions of the polishing layer 122, e.g., to provide a polishing layer with polishing properties that vary laterally across the polishing surface. The second type of feed material can include the first type of feed material with an additive that alters the properties of the second type of feed material relative to the first type of feed material. The additive includes, for example, a surfactant that can adjust properties of the uncured feed material, for example, zeta potential, hydrophilicity, etc.

Thickness of each layer of the layers of feed material and size of each of the voxels may vary from implementation to implementation. In some implementations, when dispensed on the support 134, each voxel can have a width of, for example, 10 μm to 50 μm (e.g., 10 μm to 30 μm, 20 μm to 40 μm, 30 μm to 50 μm, approximately 20 μm, approximately 30 μm, or approximately 50 μm). Each layer can have a predetermined thickness. The thickness can be, for example, 1 to 80 um, e.g., 2 to 40 μm (e.g., 2 μm to 4 μm, 5 μm to 7 μm, 10 μm to 20 μm, 25 μm to 40 μm).

Although the method and apparatus have been described in the context of fabrication of a polishing pad, the method and apparatus can be adapted for fabrication of other articles by additive manufacturing. In this case, rather than a polishing surface, there would simply be a top surface of the object being fabricated, and there would be recesses in the top surface. The modified pattern can at least partially compensate for distortions caused by the additive manufacturing system.

In addition, although the method and apparatus haves been described in the context of fabrication by droplet ejection, the method apparatus can be adapted for fabrication by other additive manufacturing techniques, e.g., selective powder dispensing followed by sintering.

Accordingly, other implementations are within the scope of the claims.

What is claimed is:

1. An additive manufacturing system, the system comprising:
   a support;
   a first dispenser configured to dispense a polishing pad precursor by droplet ejection;
   a second dispenser configured to dispense a sacrificial material;
   at least one energy source; and
   a controller configured to
      receive data indicative of a desired shape of a polishing pad to be fabricated by droplet ejection by an additive manufacturing system, the polishing pad comprising a polishing surface having one or more partitions separated by one or more grooves, and cause the first dispenser to depositing onto a lower portion of the polishing pad a plurality of successive layers by droplet ejection, wherein the controller is configured to cause the first dispenser to deliver the polishing pad precursor to first regions corresponding to the partitions of the polishing pad, and cause the second dispenser to deliver the sacrificial material to second regions that abut the first regions to form walls that line the vertical surfaces of the partitions, wherein gaps between adjacent partitions correspond to the grooves in the polishing pad.

2. The additive manufacturing system of claim 1, wherein the controller is configured to cause a dispenser to deposit a first plurality of successive layers by droplet ejection to form a lower portion of the polishing pad, and the plurality of successive layers deposited onto the lower portion of the polishing pad provide a second plurality of successive layers.

3. The additive manufacturing system of claim 2, comprising a third dispenser configured to dispense a second polishing pad precursor by droplet ejection.

4. The additive manufacturing system of claim 1, wherein the second dispenser is configured to dispense the sacrificial material by droplet ejection.

5. The additive manufacturing system of claim 1, comprising a first energy source to cure the polishing pad precursor.

6. The additive manufacturing system of claim 5, wherein the first energy source comprises a UV light source.

7. The additive manufacturing system of claim 5, comprising a second energy source to cure the sacrificial material.

8. The additive manufacturing system of claim 7, wherein the first energy source and second energy source generate different wavelengths of light.

9. The additive manufacturing system of claim 7, wherein the first energy source and second energy source generate different intensities of light.

* * * * *